United States Patent [19]

Orban

[11] 4,079,392

[45] Mar. 14, 1978

[54] SHUTTER SPEED SELECTOR ACCESSORY

[75] Inventor: Jean M. Orban, Santa Monica, Calif.

[73] Assignee: Vivitar Corporation, Santa Monica, Calif.

[21] Appl. No.: 720,549

[22] Filed: Sep. 3, 1976

[51] Int. Cl.² ............................ G03B 7/08; G03B 9/08
[52] U.S. Cl. ................................. 354/50; 354/60 R; 354/234
[58] Field of Search ............... 354/38, 48, 50, 60 R, 354/226, 234, 29, 30, 289

[56] References Cited
U.S. PATENT DOCUMENTS

| | | | |
|---|---|---|---|
| 3,848,984 | 11/1974 | Kanno | 354/38 |
| 3,945,024 | 3/1976 | Hasegawa et al. | 354/38 X |
| 3,964,075 | 6/1976 | Ohtaki et al. | 354/60 R X |

Primary Examiner—L. T. Hix
Assistant Examiner—M. L. Gellner
Attorney, Agent, or Firm—Lyon & Lyon

[57] ABSTRACT

Apparatus for converting a camera metering system from a manually set electronic metering system into an automatic, aperture-preferred metering system uses sensing means responsive to exposure signals provided by the metering system of the camera for providing a signal to drive means for automatically selecting the proper shutter speed.

11 Claims, 4 Drawing Figures

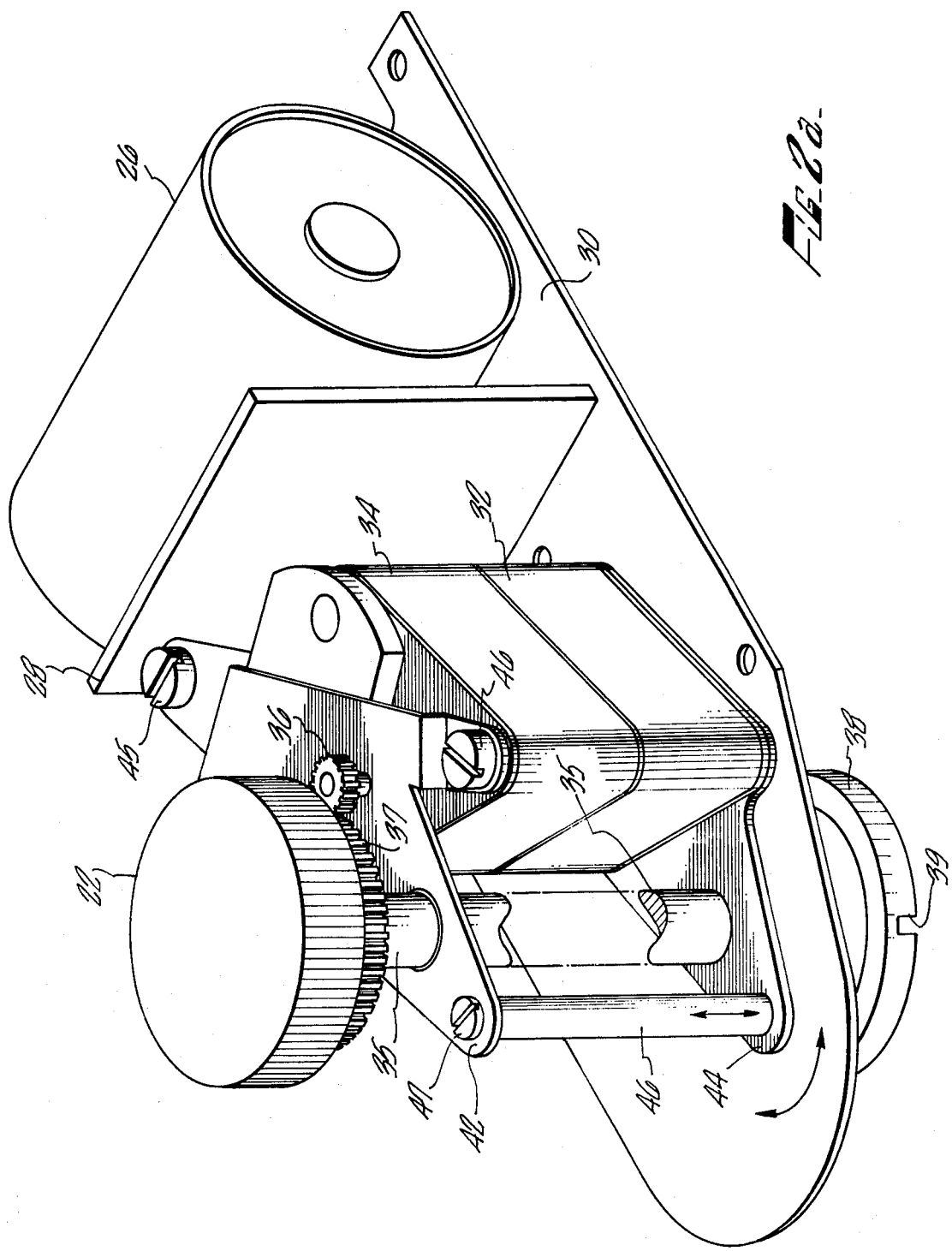

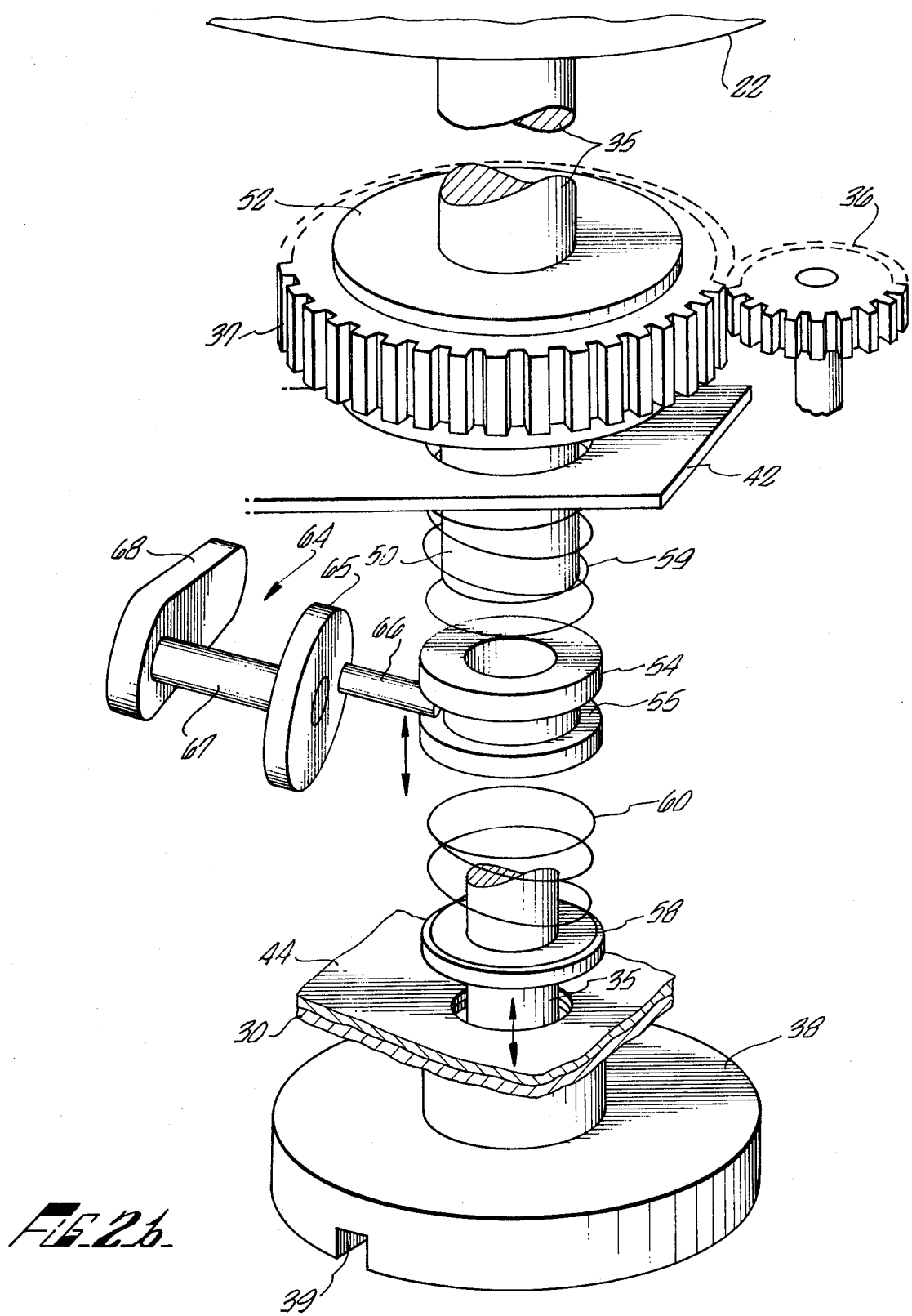

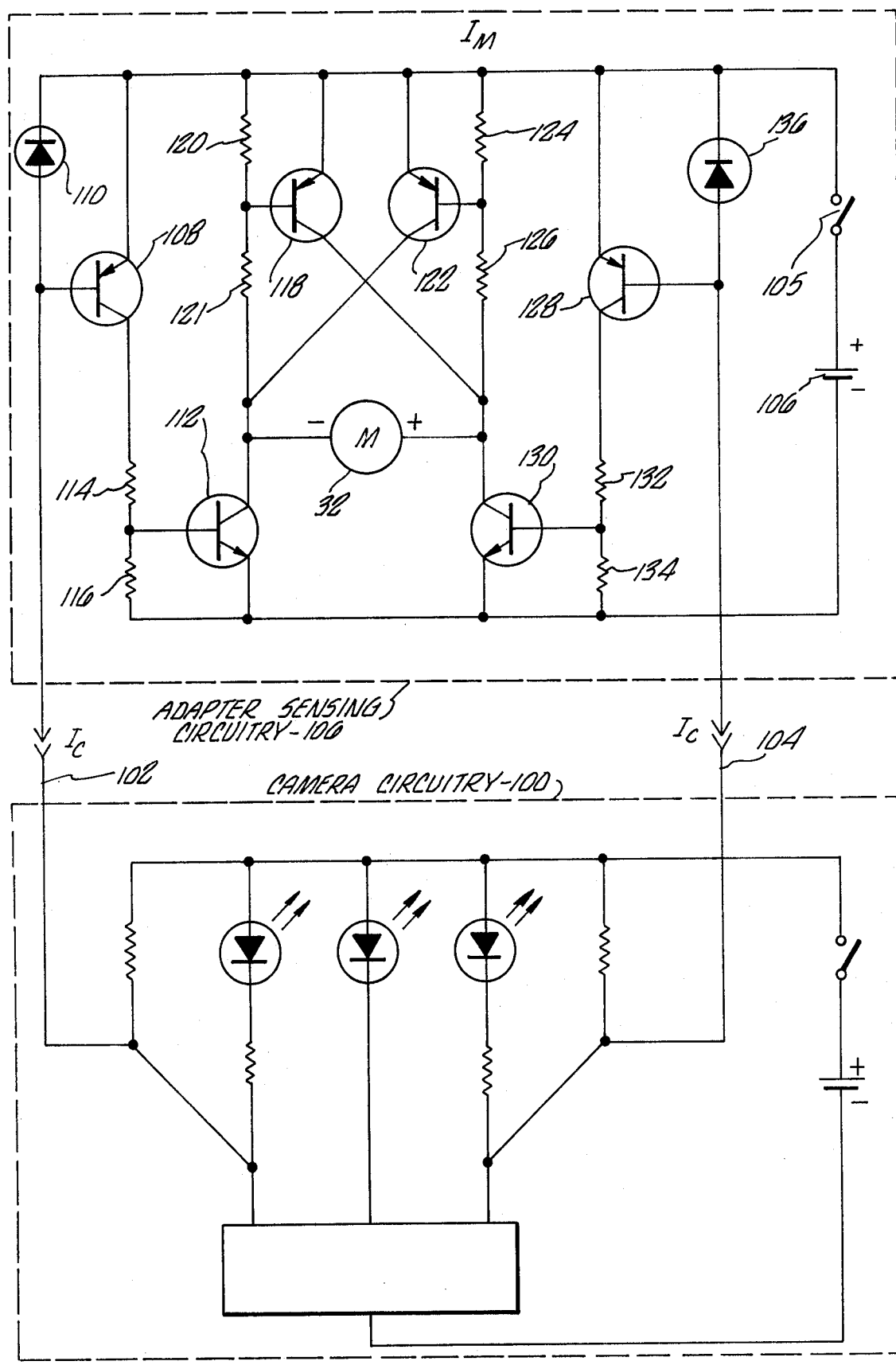

SHUTTER SPEED SELECTOR ACCESSORY

BACKGROUND OF THE INVENTION

Sophisticated modern cameras typically employ a through-the-lens metering system which senses the amount of light reaching a photosensitive device, for example, a photodiode. By means of an associated electrical circuit, the ambient light reaching the photosensitive device is converted into a signal indicating to the photographer either an overexposed, underexposed or proper metering condition.

Conventionally, the photographer manually adjusts the aperture and shutter speed settings of the camera in response to the exposure signals provided by the meter, usually with the goal of achieving a proper metering condition—i.e., one that the meter indicates is neither underexposed nor overexposed. Frequently, however, it is desirable to select only the aperture of the exposure and to have automatically selected the corresponding shutter speed suitable for a proper exposure. While certain prior art camera metering systems have incorporated this facility, many cameras using through-the-lens metering systems have no provision for such automatic selection of shutter speed. Before the present invention, a photographer with such a manually adjusted camera has been unable to obtain automatic exposure adjustment.

Therefore, a need has existed for a device which may be attached to a conventional camera employing through-the-lens metering to provide automatic selection of shutter speed suitable for a proper exposure.

SUMMARY OF THE INVENTION

The present invention relates to camera metering systems and, more particularly, to aperture-preferred automatic metering systems. The present invention comprises an apparatus or accessory which may be attached to a conventional camera body and connected to the metering circuitry internal to the camera to convert the camera metering system from manually adjusted to an aperture-preferred automatic metering system, and also can convert a shutter-preferred system to a fully automatic system.

Typically, the present invention employs a power source to power an electrical circuit and a motor. The electrical circuit of the present invention responds to signals from the camera metering circuitry and drives a bidirectional motor. If the signals from the camera metering system indicate an overexposure condition, the electrical circuit causes the motor to rotate in a direction which increases shutter speed; conversely, if an underexposure condition exists, the motor is caused to rotate so as to decrease shutter speed. A balanced condition causes the motor to cease rotation.

The rotation of the motor causes the shutter speed adjustment on the camera to rotate by means of a gear reduction unit connected both to the motor and the camera shutter speed dial. Also, means for attaching an electronic flash and means for manually adjusting shutter speed are provided.

It is one object of the present invention to provide a means for converting a manually set metering system to an automatic metering system.

It is another object of the present invention to provide a means for adapting a manually adjusted metering system to an automatic aperture-preferred metering system.

It is another object of the present invention to provide an improved camera metering system.

THE DRAWINGS

FIGS. 2a and 2b illustrate the mechanical arrangement of the invention.

FIG. 3 illustrates the sensing circuitry used for the present invention.

DETAILED DESCRIPTION OF THE INVENTION

Figure 1:
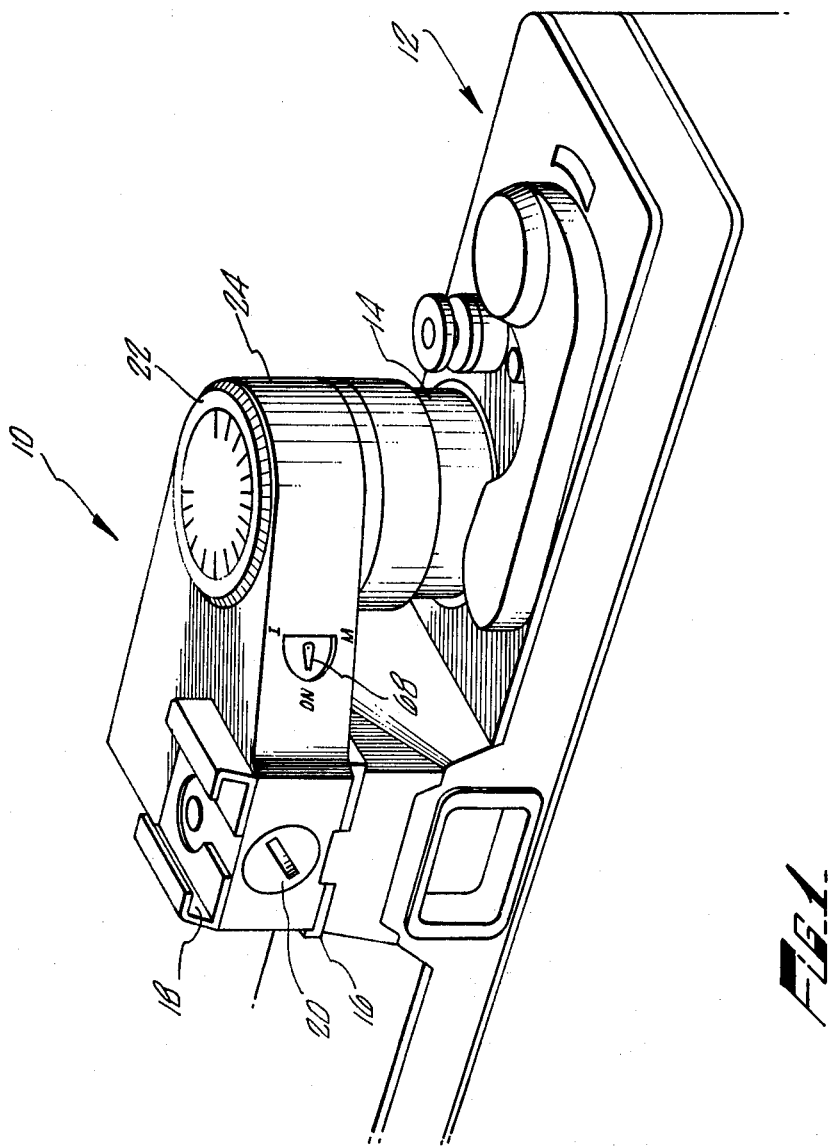
FIG. 1 illustrates the present invention attached to the body of a camera as during normal operation.

Attention is drawn to FIG. 1 which illustrates a preferred embodiment of the invention. In this embodiment, the accessory 10 is shown mounted on a camera body 12 by being attached to the accessory mount 16 and engaging the shutter speed adjustment knob 14. A flash mount 18 may be provided on the top surface of the accessory 10, if desired, so that an electronic flash may be used. A battery cover 20 is also provided to allow access to a battery within the housing. The shutter speed selected by the accessory 10 is indicated by means of a shutter speed dial 22 located directly above the shutter speed adjustment knob 14 on camera 12. The shutter speed may be manually adjusted with the accessory attached by means of the dial 22. A top cover 24 houses and protects the inner elements of the accessory 10.

Referring now to FIG. 2a, the accessory 10 is illustrated with the cover 24 removed, revealing most of the various mechanical and electrical components, further detail thereof being shown in FIG. 2b. The accessory is powered by a battery 26 which is accessible through the cover 20 shown in FIG. 1. The circuitry used in the sensing means of the invention (described below with respect to FIG. 3) is located on a circuit board 28 mounted on a baseplate 30, and the signals supplied to the circuit board 28 by the camera metering system may be obtained through a connector located in the camera accessory mount 16 or, alternatively, through a separate two-wire cable connected to a jack provided on the camera body. The plate 30 also supports the battery 26 as well as the remainder of the components of the accessory. Depending upon signals from the circuitry carried on the circuit board 28, the shaft of a motor 32, connected to gearing in a gear box 34, is rotated in one direction or the other so as to decrease or increase the shutter speed, as described in connection with FIG. 3, by changing the position of the shutter speed knob 14 of the camera.

The gear box 34 is connected to the shutter speed adjustment shaft 35 through gears 36 and 37 so that when the motor 32 rotates, the gearing, which may provide a 1 to 200 reduction, rotates the adjustment shaft 35. The adjustment shaft 35 is connected to the camera shutter speed adjustment knob 14 through a connector 38 which has a slot 39 to engage a pin (not shown) extending upwardly from the knob 14 so that the camera shutter speed varies according to the rotation of the motor. The shutter speed dial 22 of the accessory is fixed to the top of the adjustment shaft 35 as to provide an indication of the shutter speed at which the particular photograph is being shot and to permit manual shutter speed adjustment as will be described below.

An upper plate 42 and a lower plate 44 are secured to the baseplate 30 and support the motor 32, gear box 34 and adjustment shaft 35 assembly. These plates have circular slots through which the adjustment shaft 35 passes thereby maintaining the adjustment shaft 35 in a vertical position while permitting accurate rotation thereof. The upper plate 42 retains the motor 32 and gear box 34 in position by means of screws 45-47 fastened to the baseplate 30.

FIG. 2b illustrates the adjustment shaft 35 assembly in greater detail. The shutter speed dial 22 is affixed to the upper end of the shaft 35, and the connector 38 is affixed to the lower end of this shaft. The shaft extends through the circular slots in the upper plate 42 and lower plate 44 and extends through a similar slot in the baseplate 30. The gear 37 of the adjustment shaft 35 is journaled and can rotate with respect thereto for manual adjustments as will be explained. The gear 37 includes an integral flange 50 which extends downwardly through the circular slot in the upper plate 42. A resilient clutch plate 52 is disposed on the shaft 35 between the lower surface of the dial 22 and the upper surface of the gear 37 to cause the gear 37 to normally drive, and thus rotate the dial 22 when the gear 37 is driven by the gear 36 from the motor.

Mounted below the lower end of the flange 50 of the gear 37 is a collar 54 having a periphiral groove 55. The collar 54 is freely rotatable on the shaft 35. Mounted below the collar 54 is a retainer or washer 58 which is affixed to the shaft 35. A first spring 59 is arranged between the upper surface of the collar 54 and the upper surface of the washer 58. The collar 54 thus is disposed between the two springs 59 and 60, and the lower spring 60 provides a greater force than does the upper spring 59. The lower spring 60 normally pushes the collar 54 against the lower surface of the flange 50 of the gear 37, and against the force of the upper spring 59, to maintain the upper surface of the gear 37 in frictional engagement with the under surface of the dial 22 through the clutch plate 52. This enables the dial 22 to be rotated upon rotation of the gear 37, thus causing rotation of the shaft 35 and connects 38. On the other hand, the collar 54 can be raised upwardly by a cam assembly 64 to raise (several millimeters) the entire adjustment shaft 35 assembly so as to enable the connector 38 to be raised when engaging the same with the shutter speed knob 14 of the camera (and to allow engagement of the slot 39 of the connector 28 with the pin on the knob 14). Furthermore, the collar 54 can be moved downwardly against the force of the spring 60 to effectively disengage the clutch plate 52 (a fraction of a millimeter movement is sufficient) to allow the dial 22 to be manually rotated by the user rotating the shutter speed adjustment knob 14, but without turning the gear 37.

The cam assembly 64 for moving the collar 54 up and down includes a cam plate 65 having a pin 66 which rides in the groove 55 of the collar 54. A shaft 67 is connected to the center of the cam plate 65, and the other end of this shaft is connected to an adjustment lever 68. The lever 68 is positioned on the outside of the housing 24 of the accessory (see FIG. 1) to allow the user to move the lever 68 for moving the collar 54. In an exemplary construction, movement of the lever 68 to full up position (position I in FIG. 1) raises the collar 54 which also raises the connector 38 to allow insertion of the accessory onto the camera and engagement of the connector 38 with the shutter speed adjustment knob 14. Moving the lever 68 to the full down position (position M as shown in FIG. 1) causes the collar 54 to move downwardly to thereby allow manual adjustment of the dial 22 and thus adjustment of the shutter speed knob 14 through the connector 38 without causing the gear 37 to turn. The intermediate or middle position (position ON as shown in FIG. 1) allows the collar 54 to remain in a position as set by the springs 59 and 60, and typically with the collar 54 abutting the lower surface of the flange 50 of the gear 37. In this position, the motor drives, through the gears of gear box 34 and gear 36, the gear 37 to automatically control the position of the shutter speed knob 14. As will appear subsequently, the electronic control circuit is turned "on" when the lever 68 is in the intermediate or "ON" position. It should be apparent that rotation of the shaft of the motor 32 will cause accurate rotation of the camera shutter knob 14 through the adjustment assembly shown in FIG. 2b so as to provide an accurate metering and shutter speed control according to the signals provided by the circuitry of the circuit board 28 and as more fully described in connection with FIG. 3.

Turning now to FIG. 3, the same illustrates the sensing circuitry used in an embodiment of the present invention and also illustrates the circuitry provided by the camera. With respect to the circuitry provided by the camera, reference is made to the present inventor's co-pending application Ser. No. 597,479, filed July 21, 1975, disclosing camera metering systems of this nature and assigned to the same assignee.

From FIG. 3 it can be seen that the camera circuitry 100 provides a signal on one of lines 102 or 104 indicating either overexposure or underexposure, respectively. When no signal is present on either overexposure line 102 or underexposure line 104, the exposure is properly metered. As described below, by connecting to the lines 102 and 104, the adapter sensing circuit 106 can adjust the shutter speed knob 14 of the camera 12 by causing appropriate rotation of the motor 32, also seen in FIG. 2a, so as to eliminate the signals from lines 102 and 104. Thus, a properly metered exposure results.

As noted previously, the adapter sensing circuitry 106 is powered by a battery 26. An off-on switch 105 may be provided to conserve the battery 26 and permit manual operation if desired. As noted above, the switch 105 preferably is operated by the lever 68 and is turned "on" when the lever 68 is in its middle position (and "off" in the "I" and "M" positions). Although the adapter sensing circuitry 106 is recognized as symmetrical, for purposes of example, let it be assumed that a signal on line 102 indicates an overexposure or a need to increase shutter speed and that a signal on line 104 indicates an underexposure or a need to decrease shutter speed.

When a signal occurs on line 102, a pnp transistor 108, which is held biased under normal operation by means of a diode 110 connected between the base and emitter thereof, is turned on. When the transistor 108 turns on, current flows through a resistor 114 into the base of an npn transistor 112 turning on the transistor 112, the collector of which is connected to the negative side of the motor 32. The npn transistor 112 is biased during normal operation by means of the resistor 114, connected between the collector of the transistor 108 and the base of the transistor 112, and by a resistor 116, connected between the base and the emitter of the transistor 112. When the transistor 112 turns on and virtually grounds the collector thereof, current is permitted to flow through the motor 32 and pnp transistor 118, the collector of which is connected to the positive side of the motor 32 and the emitter of which is connected to the positive battery terminal. The transistor 118 is normally biased by means of a resistor 120, connected between the base and emitter thereof, and a resistor 121, connected between the base thereof and the collector of a transistor 112.

Since the metering system described in co-pending application Ser. No. 597,479, noted above, can provide a signal only on either line 102 or line 104, when a signal is present on line 102, no signal is present on line 104. This dictates that a pnp transistor 128, analogous to the transistor 108, is turned off. In turn, this means that a transistor 130, analogous to transistor 112, is also turned off since the only supply of base current to the transistor 130 is through a resistor 132 connected between the collector of transistor 128 and the base of the transistor 130. A resistor 134 is connected between the base and emitter of the transistor 130 for quiescent biasing. The collector of the transistor 130 is connected to the collector of the transistor 118 and to the positive terminal of the motor 32. The emitter of the transistor 130 is grounded. Since the transistor 130 is turned off when no signal is present on line 104, the current which is flowing through the transistor 118 is required to flow only through the motor 32 and thence to ground through the saturated transistor 112. In response to this current flow, the motor rotates in the required direction to increase shutter speed. In this matter, the camera shutter speed is adjusted in accordance with the mechanical means described in connection with FIG. 2.

The emitter of the transistor 122 is connected to the positive battery terminal and is biased during quiescent operation by means of a first resistor 124, connected between the base and emitter thereof and a second resistor 126, connected between the base thereof and the collector of the transsistor 130.

In the event that an underexposure condition exists requiring a decrease in shutter speed, a signal appears on line 104 which permits current to flow through the pnp transistor 128, which is normally biased by means of a diode 136 connected between the base and emitter thereof. Since current is flowing through the transistor 128, the transistor 130 turns on and permits current to flow through the transistors 122 and 130 directly through the motor 32 to ground. As before, however, when a signal exists on line 104, no signal can exist on line 102 and thus transistors 108 and 112 are both turned off. As a result, current is forced to flow through transistor 122 through the motor 32 and then through the transistor 130 to ground. Since current now flows through the motor 32 in the direction opposite to that for an overexposure condition, the motor rotates in the opposite direction and thus decreases shutter speed. As a result, exposure is increased and proper metering may be achieved.

When the camera metering system indicates a proper exposure, no signal is present on either line 102 or 104, both transistor 108 and transistor 128, and all the others, are turned off and no substantial current is permitted to flow through the motor 32. Thus, the photograph may be taken at the proper exposure.

Having thus described in detail a preferred embodiment of the invention, it is to be recognized that various substitutions may be made without altering from the spirit of the present invention and that these alterations are to be included within the present invention.

I claim:

1. An adapter for use with a camera for automatically setting proper shutter speed, comprising a housing adapted to be physically attached to the body of said camera, a motor supported in said housing and adapted to rotate a shutter speed adjustment knob of said camera, and electronic circuit means supported in said housing and responsive to a light metering circuit of said camera to cause said motor to rotate said shutter speed adjustment knob to provide a shutter speed as directed by said camera metering circuit.

2. An adapter as in claim 1 wherein said camera light metering circuit provides underexposure and overexposure signals, and said electronic circuit means provides first and second voltage signals, said first voltage signal being provided in response to said overexposure signal to cause said motor to rotate said shutter speed adjustment knob to increase shutter speed and said second voltage signal being provided in response to said underexposure signal to cause said motor to rotate said shutter speed adjustment knob to decrease shutter speed.

3. An adapter for use with a camera exposure metering system for automatically fixing proper exposure time, comprising drive means adapted for external connection to a shutter speed adjustment mechanism of a camera, electronic circuit means adapted for electrical connection to a camera light metering circuit and responsive thereto for controlling said drive means, wherein an improper exposure setting causes said camera light metering circuit to signal said electronic circuit means to cause said drive means to adjust said camera shutter speed adjustment mechanism until a proper exposure is indicated by said camera metering circuit, first coupling means for connecting said electronic circuit means to said camera metering circuit, and second coupling means for mechanically connecting said drive means to said camera shutter speed adjustment.

4. A device as in claim 3 wherein said drive means comprises a bi-directional motor and gear reduction means.

5. A device as in claim 3 further comprising means for electrically disconnecting said electronic circuit means from said camera metering circuit, and means for manually adjusting said camera shutter speed adjustment when said disconnecting means has disconnected said electronic circuit means from said camera metering circuit.

6. A device for automatically selecting camera shutter speeds comprising exposure controlling means adapted for connection to a camera light metering circuit which provides overexposure and underexposure signals and responsive thereto for providing first and second voltage levels, and drive means responsive to said first and second voltage levels and adapted for connection to a camera shutter speed adjustment mechanism responsive to said overexposure signal for controlling said exposure controlling means to provide said first voltage level to cause said drive means to rotate in a first direction so as to increase shutter speed, and responsive to said underexposure signal for controlling said exposure controlling means to provide said second voltage level to cause said drive means to rotate in a second direction so as to decrease shutter speed.

7. A device as in claim 6 further comprising switch means for causing said exposure sensing means to be unresponsive to signals from said camera metering circuit, and means for enabling manual adjustment of said camera shutter speed adjustment when said switch means has caused said exposure sensing means to be unresponsive to signals from said camera metering circuit.

8. A device as in claim 7 wherein said drive means comprises a bi-directional motor and gear reduction means for reducing the relative revolutions per minute of said camera shutter speed adjustment with respect to said bi-direction motor.

9. An adapter for use with a camera for automatically setting shutter speed, comprising housing means adapted to be physically attached to the body of a camera, motor means supported by said housing and adapted to rotate a shutter speed adjustment knob of the camera through an adjustment assembly means, and adjustment assembly means supported by housing to be driven by said motor means, said adjustment assembly means comprising a shutter speed dial connected through a shaft to a connector, the connector being adapted to be coupled with the shutter speed adjustment knob of the camera, said adjustment assembly means comprising clutch means for disengaging said dial with respect to said motor means and for enabling minor adjustment of said shutter speed adjustment knob through minor adjustment of said dial.

10. An adapter as in claim 9 wherein said adjustment assembly means includes a collar mounted on said shaft and spring means engaging said collar for generally maintaining said clutch means engaged, and cam and lever means for moving said collar with respect to said shaft.

11. An adapter as in claim 9 wherein said shutter speed dial is connected to the first end of said shaft and the connector is affixed to the second end of the adjustment assembly means includes a retainer affixed near the second end of the shaft, a spring and a collar mounted on the shaft above the retainer, and a spring and gear mounted on the shaft above the collar, and the clutch means includes a clutch plate mounted between the gear and the dial, one of said springs normally biasing said collar to maintain said gear in frictional engagement through said clutch plate with said dial.

* * * * *